United States Patent [19]
Mama et al.

[11] Patent Number: 5,309,182
[45] Date of Patent: May 3, 1994

[54] BICOLOR IMAGE FORMING APPARATUS FOR FORMING A BICOLOR IMAGE ON A PHOTOCONDUCTIVE ELEMENT

[75] Inventors: Takashi Mama, Yokohama; Yuji Yasuda; Kan Tomita, both of Tokyo; Fumihiro Miyagawa, Yokohama; Shinji Kobayashi, Tokyo; Takanobu Fujioka, Chofu; Hidetoshi Kanai, Yokohama; Yoshiki Yoshida, Kawasaki, all of Japan

[73] Assignee: Ricoh Co., Ltd., Tokyo, Japan

[21] Appl. No.: 969,346

[22] Filed: Oct. 30, 1992

[30] Foreign Application Priority Data

Oct. 31, 1991 [JP] Japan .................................. 3-286052
Mar. 12, 1992 [JP] Japan .................................. 4-053203
Oct. 19, 1992 [JP] Japan .................................. 4-279802

[51] Int. Cl.$^5$ ........................................ G03G 15/01
[52] U.S. Cl. .............................. 346/157; 355/326 R
[58] Field of Search ............... 346/157, 139 R, 107 R, 346/108, 155, 160; 355/326, 328

[56] References Cited

FOREIGN PATENT DOCUMENTS 2-62568 3/1990 Japan .................................. 346/157

*Primary Examiner*—Joan H. Pendegrass
*Attorney, Agent, or Firm*—Oblon, Spivak, McClelland, Maier & Neustadt

[57] ABSTRACT

A bicolor image forming apparatus having first and second exposing means and first and second developing means arranged around a photoconductive element. The first and second developing means are implemented as a deflection scanning type and a line type, respectively. Parts around a photoconductive element are arranged with ease to promote the miniaturization of the apparatus. This stems from the principle that the image quality may be enhanced for an image of particular color and lowered for an image of another color expected to be printed less frequently. Specifically, the apparatus has deflection scanning type exposing means for forming the image of particular color, and line type exposing means which has an inherently long optical path and simple structure for forming the image of another color.

14 Claims, 18 Drawing Sheets

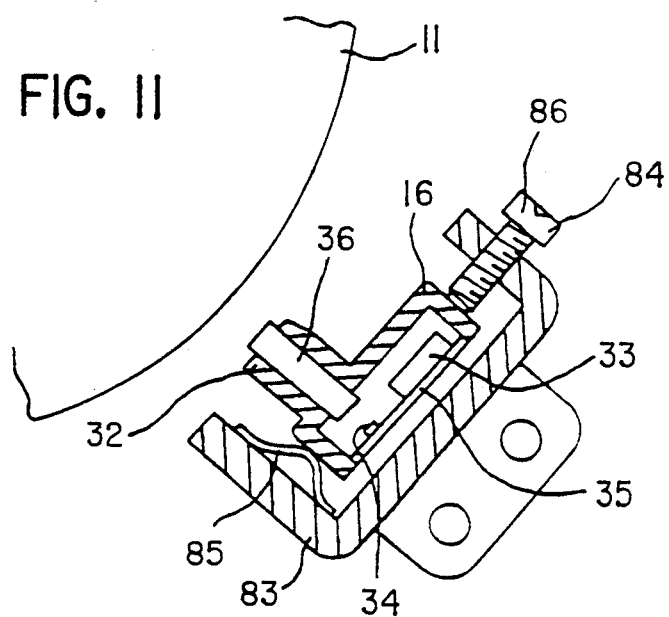
FIG. 11
FIG. 12A
FIG. 12B
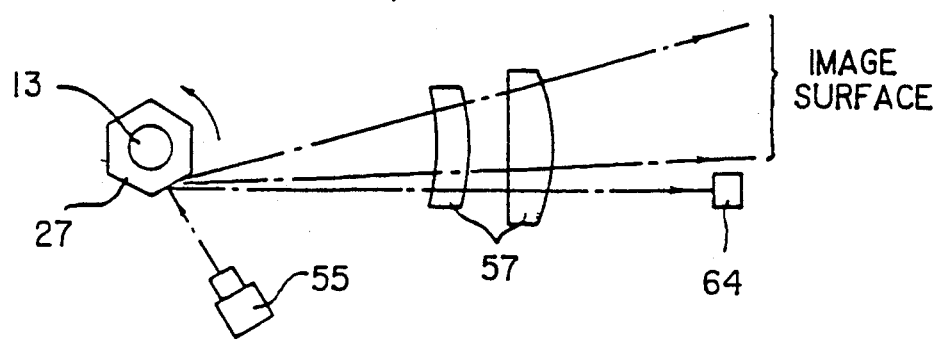
FIG. 13

BICOLOR IMAGE FORMING APPARATUS FOR FORMING A BICOLOR IMAGE ON A PHOTOCONDUCTIVE ELEMENT

BACKGROUND OF THE INVENTION

The present invention relates to an image forming apparatus for forming an image on a photoconductive element by an electrophotographic process.

Conventional image forming apparatuses include one having exposing devices and developing devices provided in pairs and arranged around a photoconductive element, as disclosed in, for example, Japanese Patent Laid-Open Publication Nos. 19764/1982, 65570/1989, 223475/1989, 148063/1990, and 203315/1990. Each exposing device and developing device pair is assigned to a particular color. Each of the exposing devices at least includes a laser unit for emitting a laser beam, a cylindrical lens for condensing the laser beam in the subscanning direction, a polygonal mirror for deflecting the condensed laser beam, a motor for driving the polygonal mirror, an f-theta lens for correcting the laser beam from the polygonal mirror, and optical elements for conducting the corrected laser beam onto the photoconductive element. The problem with such an exposing device is that the optical path is extremely long and the structure is bulky. Moreover, the exposing devices each having the above construction cause a substantial space around the photoconductive element to be simply wasted, making the overall apparatus large sized.

SUMMARY OF THE INVENTION

It is therefore an object of the present invention to provide an image forming apparatus free from the drawbacks particular to the conventional apparatus as discussed above.

An image forming apparatus of the present invention comprises a rotatable photoconductive element, chargers located to face the periphery of said photoconductive element, deflection scanning type exposing means for deflecting a light beam issuing from a beam emitting element toward the photoconductive element, first developing means for developing an electrostatic latent image formed on the periphery of the photoconductive element by the deflection scanning type exposing means, line type exposing means located to face part of the periphery of the photoconductive element other than part where the light beam from the deflection scanning type exposing means is incident, and second developing means for developing an electrostatic latent image formed on the periphery of the photoconductive element by the line type exposing means.

BRIEF DESCRIPTION OF THE DRAWINGS

The above and other objects, features and advantages of the present invention will become more apparent from the following detailed description taken with the accompanying drawings in which:

FIG. 11 is a sectional front view showing another alternative embodiment of the present invention;

FIGS. 12A and 12B each shows a particular condition of scanning lines;

FIG. 13 is a plan view of deflection scanning type exposing means representative of another alternative embodiment of the present invention;

DESCRIPTION OF THE PREFERRED EMBODIMENTS

To better understand the present invention, a brief reference will be made to some conventional image forming apparatuses of the type having a plurality of pairs of exposing means and developing means arranged around a photoconductive element.

Figure 22:
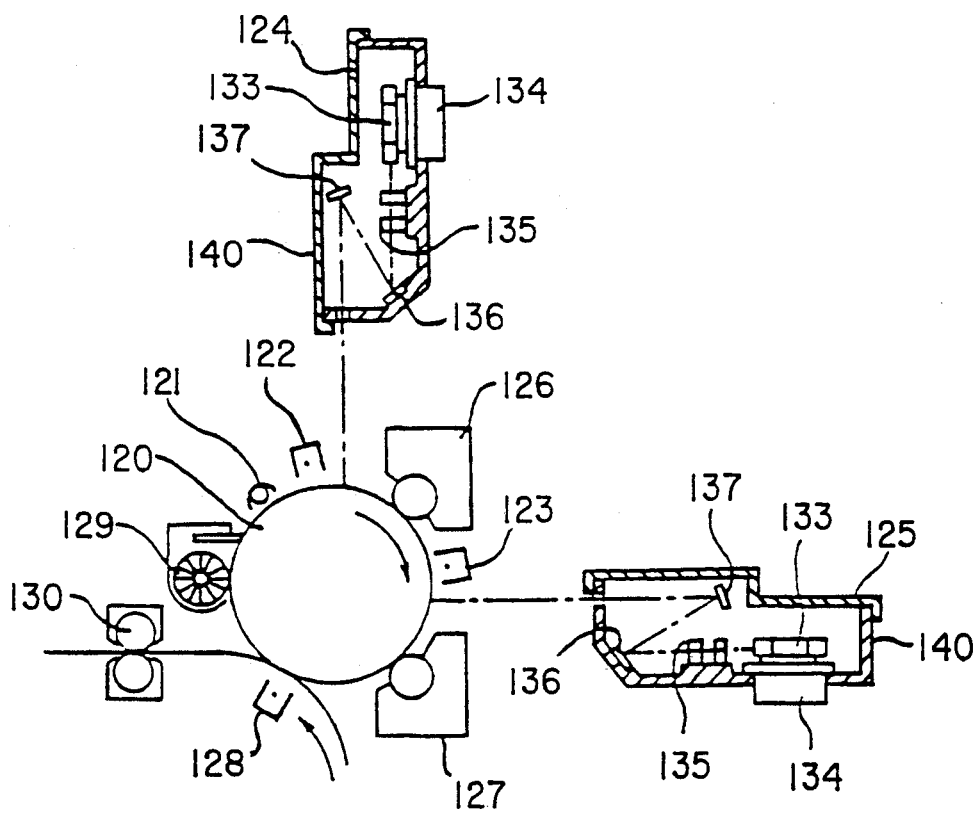
FIG. 22 is a sectional side elevation of a conventional image forming apparatus.
Figure 23:
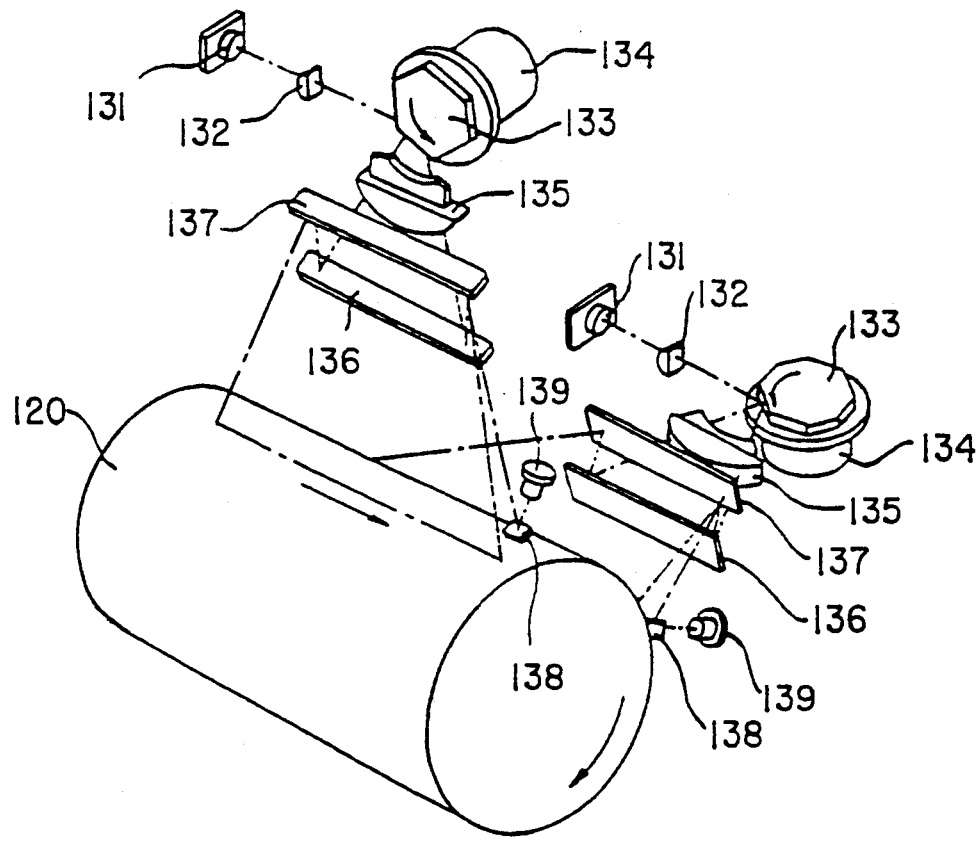
FIG. 23 is a perspective of the apparatus shown in FIG. 22.

Referring to FIGS. 22 and 23, a conventional image forming apparatus has a photoconductive element implemented as a drum 120. Arranged around the drum 120 are a discharge lamp 121, a plurality of main chargers 122 and 123, a plurality of exposing means 124 and 125, a plurality of developing means 126 and 127, a transfer charger 128, and a cleaning unit 129. While the drum 120 is rotated, the main charger 122 assigned to a particular color (e.g. black) uniformly charges the surface of the drum 120. The exposing means 124 also assigned to the particular color scans the charged surface of the drum 120 by an optical signal corresponding to an image signal, whereby a latent image is electrostatically formed on the drum 120. The developing means 126 assigned to the same color develops the latent image by use of a toner. Subsequently, the main charger 123 assigned to another color (e.g. red) uniformly charges the surface of the drum 120, the exposing means 125 scans the charged surface of the drum 120 to form an electrostatic latent image, and the developing means 127 develops the latent image. The resulting bicolor toner image is transferred from the drum 120 to a recording medium, e.g., paper sheet. A fixing roller 130 fixes the toner image on the paper sheet by heat and pressure. The cleaning unit 129 removes the toner remaining on the drum 120 after the image transfer, and then the discharge lamp 121 dissipates the charge remaining on the drum 120.

The exposing means 124 and 125 each include a laser unit 131 for emitting a laser beam. A cylindrical lens 132 condenses the laser beam toward a polygonal mirror 133 and only in the subscanning direction. A polygonal mirror 133 is rotated by a motor 134 to deflect the incident laser beam. An f-theta lens 135 corrects the laser beam from the polygonal mirror 133 such that the beam is deflected at a constant speed along the axis of the drum 120. The corrected laser beam is incident to the drum 120 via mirrors 136 and 137. The optics constituting the exposing means 124 and 125 are accommodated in respective housings 140.

Figure 24:
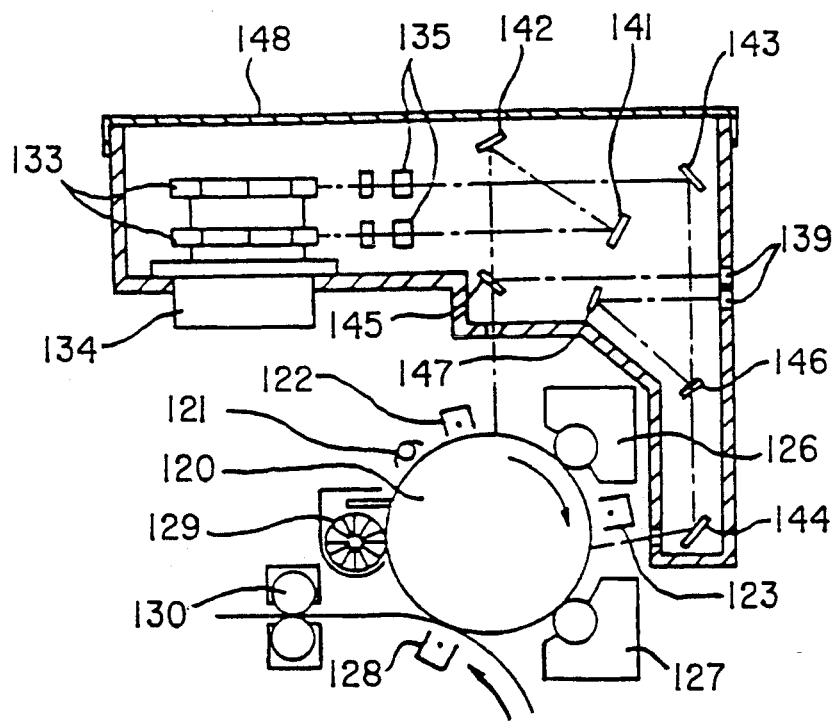
FIG. 24 is a sectional front view showing another conventional image forming apparatus.

Another conventional image forming apparatus is shown in FIG. 24. In FIG. 24, the same or similar constituents to those shown in FIGS. 22 and 23 are designated by the same reference numerals, and a detailed description will not be made to avoid redundancy. Laser beams issuing from respective laser units, not shown, are condensed by respective cylindrical lenses, not shown, in the subscanning direction. The condensed laser beams are deflected by the respective polygonal mirrors 133. The beam from one of the polygonal mirrors 133 is reflected toward the drum 120 by mirrors 141 and 142 while the beam from the other polygonal mirror 133 is reflected toward the drum 120 by mirrors 143 and 144. As a result, two electrostatic latent images are formed on the drum 120 at circumferentially spaced positions. The developing means 126 and 127 each develop one of the two latent images in a particular color. At the same time, the beam from the mirror 142 is incident to a position sensor 139 via a mirror 145 while the beam from the mirror 143 is incident to another position sensor 139 via mirrors 146 and 147. Such optical arrangements are accommodated in a single housing 148.

The problem with the apparatus having a plurality of exposing means 124 and 125, FIGS. 22 and 23, is that the structure is bulky due to the laser units 131, motors 134, polygonal mirrors 133 and other optical elements and due to the long optical paths. This problem is particular to the deflection scanning type exposing means. Moreover, since a plurality of exposing means 124 and 125 are located independently of each other, a substantial part of the space around the drum 120 is wasted, making the overall structure more bulky. In addition, when a plurality of exposing means 124 and 125 are used, it is likely that the latent images formed thereby are dislocated, i.e., colors are brought out of register on a color printing.

The apparatus shown in FIG. 24 has a single motor 134 for driving the two polygonal mirrors 132 and has a single housing 148 accommodating all the optical arrangements. Such a configuration is slightly smaller in size than the configuration of FIGS. 22 and 23. However, the size reduction achievable with the apparatus of FIG. 24 is limited due to the deflection scanning type exposing means. As a result, the space available around the drum 120 cannot be increased, preventing the developing means 126 and 127 from incorporating a larger toner container. Therefore, the developing means 126 and 127 each has to be supplemented with a toner frequently.

Figure 1:
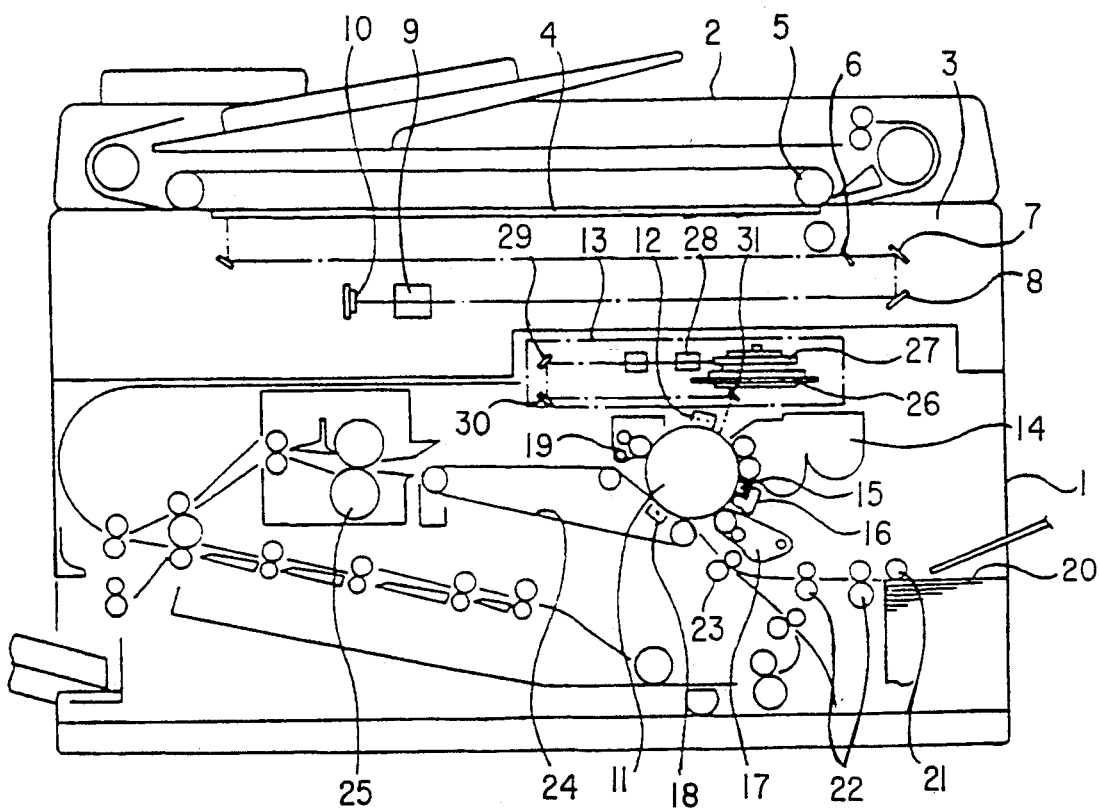
FIG. 1 is a sectional front view of an image forming apparatus embodying the present invention.
Figure 2:
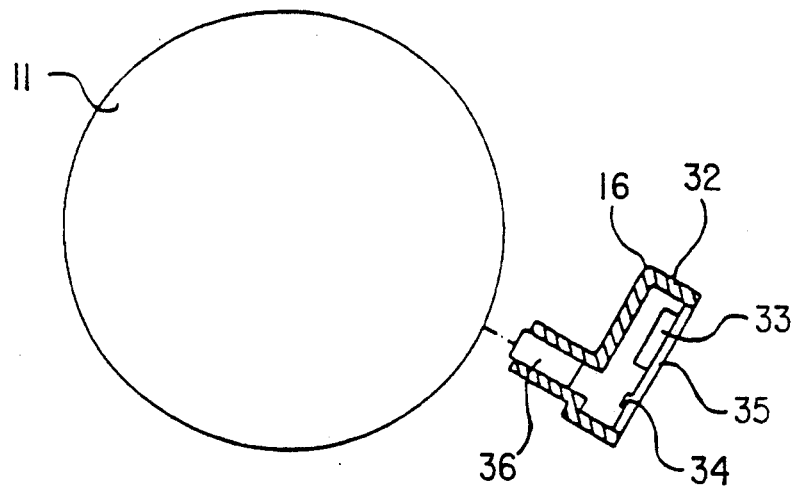
FIG. 2 is a sectional front view of line type exposing means included in the embodiment.

Referring to FIGS. 1 and 2, an image forming apparatus embodying the present invention is shown and implemented as a digital copier by way of example. As shown, the copier has a body 1 and an automatic document feeder (ADF) mounted on the top of the body 1. An image reading device 3 is accommodated in and located in an upper portion of the body 1 for reading a document fed by the ADF 2. Specifically, as a document is positioned on a glass platen 4 by the ADF 2, the image reading device 3 illuminates it with a light source 5. The resulting reflection from the document is sequentially reflected by a plurality of mirrors 6, 7 and 8 and then focused by a lens 9 onto a CCD (Charge Coupled Device) image sensor 10. The CCD image sensor 10 transforms color components of the document image separated by a filter, not shown, to electric signals of corresponding colors.

A photoconductive element in the form of a drum 11 is rotatably disposed below the image reading device 3. Arranged around the drum 11 are a first main charger 12, deflection scanning type exposing means 13, first developing means 14, a second main charger 15, line type exposing means 16, second developing means 17, an image transfer unit 18, and a cleaning unit 19. A paper tray, not shown, is mounted on one side of the body 1. A pick-up roller 21 for feeding paper sheets one by one from the paper tray, a plurality of transport rollers 22, a register roller 23, an image transfer belt 24, and a fixing section 25 are also mounted on the body 1.

The deflection scanning type exposing means 13 includes a laser diode or similar beam emitting device, not shown, and a cylindrical lens, not shown, for condensing a beam from the beam emitting device in the suscanning direction. A polygonal mirror 27 is rotated by a motor 26 to deflect the condensed beam. The deflected beam is incident to the drum 11 via mirrors 29, 30 and 31.

As shown in FIG. 2, the line type exposing means 16 has a housing 32 accommodating a base plate 35 and a rod lens array 36. The base plate 35 supports an IC (Integrated Circuit) drive circuit 33 and an LED (Light Emitting Diode) array chip 34 thereon. The rod lens array 36 is located to face the LED array chip 34. The LED array chip 34 has a number of LEDs arranged in the axial direction of the drum 11 and connected to the IC drive circuit 33 by wire bonding.

In operation, the image data or video data generated by the image reading device 3, i.e., by the CCD image sensor 10 in the form of electric signals of respective colors are processed by an image processing section, not shown. Subsequently, the video data of particular color (e.g. black) is fed to the deflection scanning type exposing means 13. The video data of another color (e.g. red) is once stored in a memory, not shown, and then fed to the line type exposing means 16 later than the above-mentioned image data of particular color. While the drum 11 is rotated clockwise, the first and second chargers 12 and 15 each discharging at a predetermined time charge the surface of the drum 11. As a result, the two exposing means 13 and 16 form respective latent images on the charged surface of the drum 11. The first and second developing means 14 and 17 each develops one of the latent images. A paper sheet 20 is fed by the pick-up roller 21 and transport rollers 22 and then driven by the register roller 23 in synchronism with the rotation of the drum 11. As the paper sheet 20 reaches the lower part of the drum 11, the image transfer unit 18 transfers the developed images from the drum 11 to the paper sheet 20. The fixing section 25 fixes the bicolor image on the paper sheet 20 by heat and pressure.

In such a bicolor digital copier, a black-and-white image is considered to be the primary image and formed in high resolution by the deflection scanning type exposing means 13 which has an inherently high pixel density. Since an image of the other color, e.g., red is printed less frequently than a black-and -white image, it is formed by the line type exposing means 16 having a short optical path and simple structure although the image quality may be lowered. This facilitates the arrangement of parts around the drum 11 and allows each of the developing means 14 and 17 to be loaded with a larger toner container. In addition, the entire copier body 1 is miniaturized.

The memory for storing image data needs only a minimum of capacity since the line type exposing means 16 has a smaller number of tones per dot and a lower pixel density than the deflection scanning type exposing means 13. This contributes to the cut-down of cost.

While the line type exposing means 16 has been shown and described as having the LED array chip 34 as a major component thereof, the LED array chip 34 may be replaced with a fluorescent tube dot array or a combination of a fluorescent lamp or similar light source and a liquid crystal shutter array or PLZT shutter array.

Figure 3:
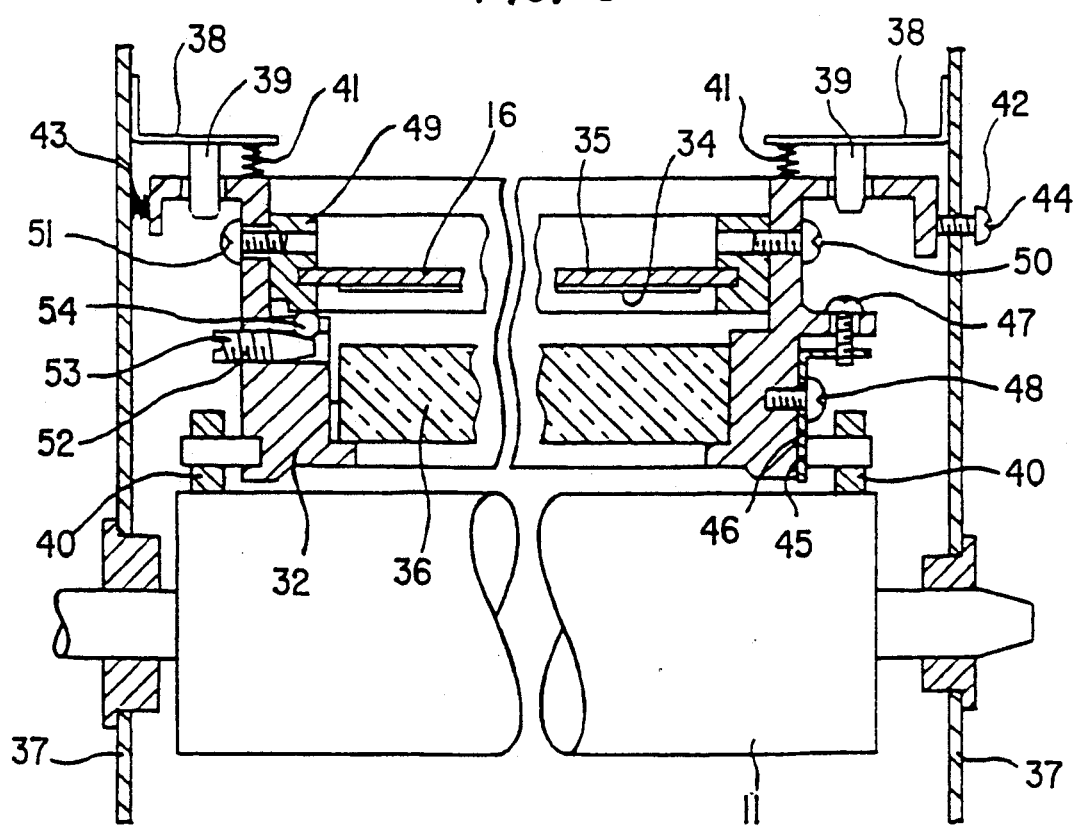
FIG. 3 is a sectional side elevation showing an alternative embodiment of the present invention.
Figure 4A:
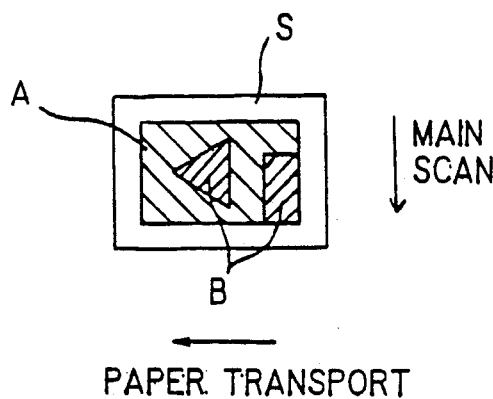
FIGS. 4A and 4B each shows a particular image forming condition.
Figure 4B:
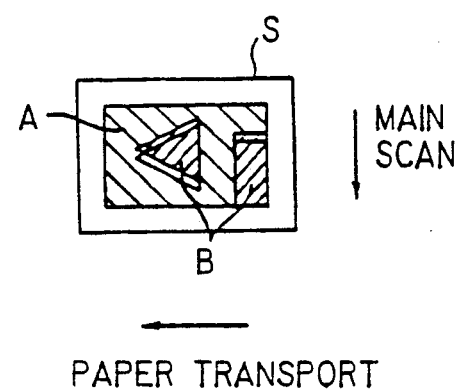

FIGS. 3, 4A and 4B show an alternative embodiment of the present invention. In the figures, the same or similar constituents to those of the previous embodiment are designated by the same reference numerals, and a detailed description will not be made to avoid redundancy. This is also true with other embodiments to follow. As shown, the drum 11 is rotatably supported by left and right side panels 37. A generally L-shaped support 38 is affixed to each of the side panels 37 while a pin 39 is studded on each support 38. The housing 32 of the line type exposing means 16 is slidably supported by the pins 39 at opposite sides thereof. Rollers 40 are mounted on opposite sides of the housing 32 and biased against opposite edges of the periphery of the drum 11 by springs 41, whereby the distance between the housing 32 and the drum 11 is determined. Image position changing means 42 is provided for changing the image position of the line type exposing means 16 in the main scanning direction, as needed. The image position changing means 42 is constituted by a spring 43 biasing the housing 32 to one side, and an adjusting screw 44 threaded into one of the side panels 37 and urging the housing 32 against the action of the spring 43.

In the above construction, when the adjusting screw 44 is driven, the line type exposing means 16 is bodily moved in the axial direction of the drum 11 to change the image forming position on the drum 11 in the main scanning direction. FIG. 4A shows a condition wherein images A and B formed by the deflection scanning type exposing means 13 and line type exposing means 16, respectively, are in register. FIG. 4B shows a condition wherein the image B is deviated from the image A. When the condition shown in FIG. 4B occurs, the adjusting screw 44 is turned to shift the exposing means 16 along the axis of the drum 11 until the image B has been brought into register with the image A.

Referring again to FIG. 3, another alternative embodiment of the present invention will be described. This embodiment includes an angle adjusting mechanism 45 for moving or inclining the line type exposing means 16 relative to the axis of the drum 11. The angle adjusting mechanism 45 is made up of a generally L-shaped bracket 46 slidably mounted on one side of the housing 32, and adjusting screw 47 having a head rotatably retained by the housing 32 and having a shank driven into the bracket 46, and a fixing screw 48 pressing the bracket 46 against the one side of the housing 32. One of the previously stated rollers 40 is supported by the bracket 46. Before the fixing screw 48 is tightened, the adjusting screw 47 may be turned to change the position of the roller 40 supported by the bracket 46 relative to the housing 32. Then, the angular position of the line type exposing means 16 relative to the axis of the drum 11 will change. As a result, the angle of the beam incident on the drum 11 from the LED array chip 34 and, therefore, the image forming width on the drum 11 in the main scanning direction will be adjusted. Specifically, the angle adjusting mechanism 45 plays the role of image position changing means for changing the image forming width in the main scanning direction.

Another alternative embodiment of the present invention will be described with reference to FIG. 3. In the line type exposing means 16, the base plate 35 supporting the LED array chip 34 is mounted on a support member 49. The support member 49 is affixed to the right end of the housing 32 by a fixing screw 50 at the right end thereof. The left end of the support member 49 is held by the left end of the housing 32 in such a manner as to be movable away from the drum 11 and is fixed in place by a fixing screw 51. An angle adjusting mechanism 52 is provided for angularly displacing the base plate 35 relative to the axis of the drum 11. The mechanism 52 has a tapered adjusting screw 53 threaded into the left end of the housing 32, and a steel ball 54 intervening between the adjusting screw 53 and the left end of the support member 49.

In the above construction, when the adjusting screw 53 is turned in the tightening direction with the fixing screw 51 loosened, the steel ball 54 presses the left end of the support member 49 away from the drum 11. When the adjusting screw 53 is turned in the loosening direction, the support member 49 is moved toward the drum 11. As a result, the inclination of the base plate 35 and LED array chip 34 is changed relative to the axis of the drum 11. This in turn changes the angle of the beam incident on the drum 11 from the LED array chip 34 and, therefore, the image forming width on the drum 11 in the main scanning direction. In this sense, the angle adjusting mechanism 53 plays the role of image position changing means for changing the image forming width in the main scanning direction.

Figure 5:
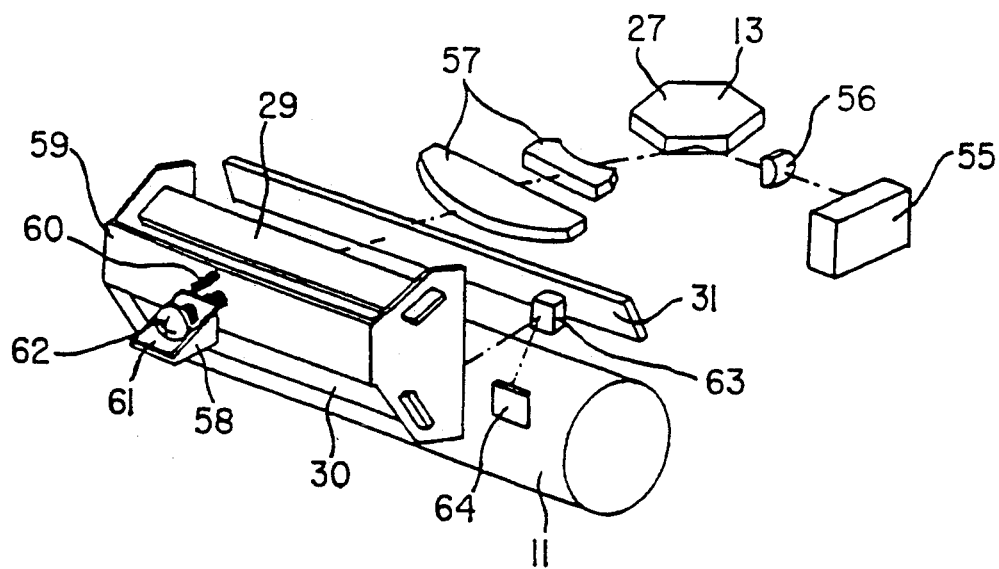
FIG. 5 is a perspective view of deflection scanning type exposing means representative of another alternative embodiment of the present invention.

A reference will be made to FIG. 5 for describing another alternative embodiment of the present invention. As shown, the deflection scanning type exposing means 13 is constructed such that a laser beam issuing from a laser diode 55 is routed through a lens 56 to the polygonal mirror, or deflector, 27 and steered by the mirror 27 to the drum 11 via the mirrors 29, 30 and 31. An f-theta lens 57 is interposed between the polygonal mirror 27 and the mirror 29. A mirror 63 and a PIN photodiode or similar sensor 64 are located outside the scanning range. As the mirror 30 reflects light reflected by an end portion of the mirror 30, the sensor 64 generates a synchronization signal on receiving the light from the mirror 63. A path length adjusting mechanism 58 is provided for changing the length of the optical path extending from the polygonal mirror 27 to the drum 11. The mechanism 58 is constituted by a spring 60 biasing a support 59 supporting the mirrors 29 and 30 away from the polygonal mirror 27, and an adjusting screw 62 threaded into a bracket 61 and urging the support 59 against the action of the spring 60. The bracket 61 is affixed to a frame or similar stationary member, not shown.

In this embodiment, as the adjusting screw 62 is turned, the support 59 is moved toward or away from the polygonal mirror 27 together with the mirrors 29 and 30. As a result, the length of the optical length extending from the polygonal mirror 27 to the drum 11 changes. This in turn changes the diameter of the beam spot as measured on the drum 11, i.e., the image forming width in the main scanning direction. In this manner, the image forming width of the deflection scanning type exposing means 13 in the main scanning direction can be adjusted by taking account of the deviation of an image to be formed by the line type exposing means in the main scanning direction. Then, images formed by the two exposing means 13 and 16 will be free from deviation, insuring an attractive printing with accurately registered colors. The path length adjusting means 58 also plays the role of image position changing means.

Other alternative embodiments will be described hereinafter in which the image position changing means is implemented by electric circuitry. As stated above, the image position changing means includes a method of moving the image forming position in the main scanning direction and a method of changing the image forming width in the same direction.

Figure 6:
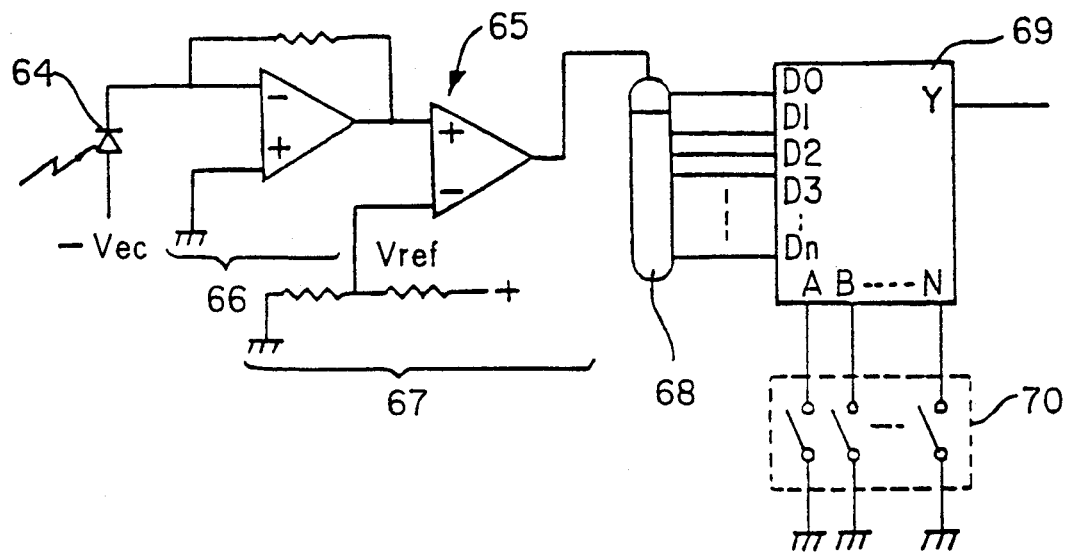
FIG. 6 is a circuit diagram showing a circuit for setting a time for starting exposure and playing the role of image position changing means.

FIG. 6 shows a circuit 65 for setting a time for starting exposure and which is a specific form of the image position changing means of the type moving the image forming position in the main scanning direction. In the deflection scanning type exposing means 13, the sensor 64 for generating a synchronization signal as stated earlier, an amplifying circuit 66 for amplifying the synchronization signal, a waveform shaping circuit 67 for shaping the waveform of the output of the amplifying circuit 66, a delay circuit 68, a data selector 69 having a plurality of delay time data, and a switch section 70 for applying a data selection signal meant for the data selector 69 from the outside are connected, as illustrated.

Figure 7:
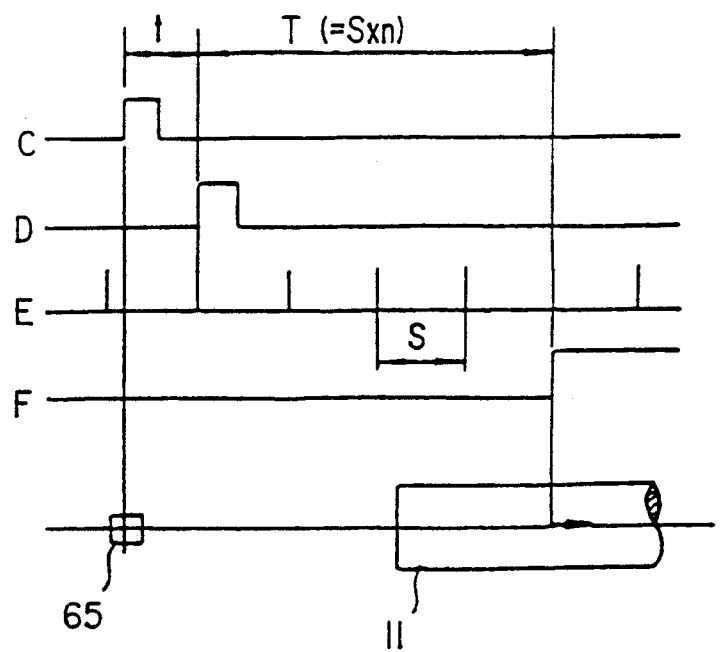
FIG. 7 is a timing chart associated with FIG. 6.
Figure 8:
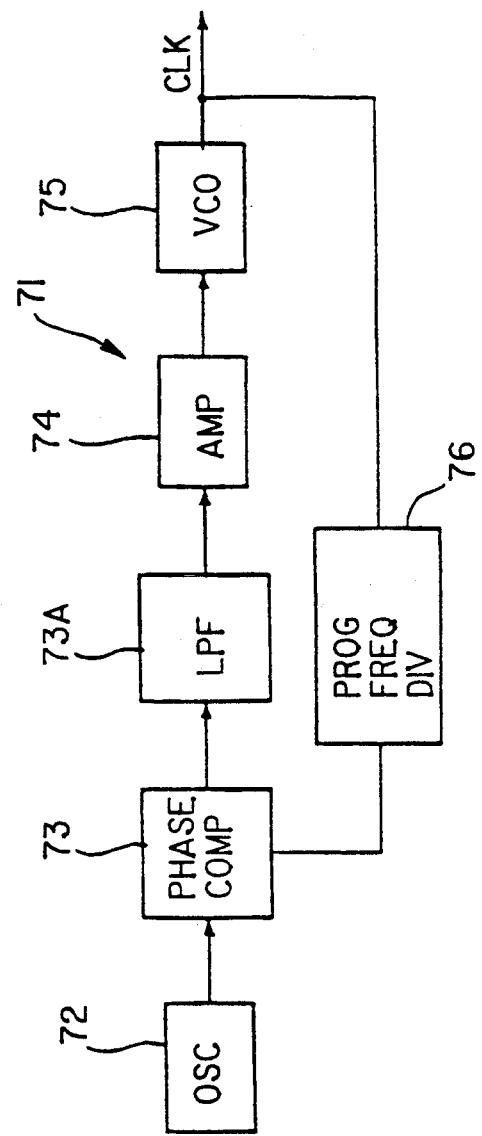
FIG. 8 is a circuit diagram showing an image width changing circuit serving as image position changing means.

The operation of the circuit 65 will be described with reference to FIG. 7. There are shown in FIG. 7 a synchronization signal C generated by the sensor 64, a signal D produced by delaying the signal C by a period of time t, a video clock E synchronous to the signal D, and an exposure start signal F. The exposure start signal F may be changed by changing the count n of the video clock E having a period S, and the delay time t. Therefore, by taking account of a positional deviation of an image to be formed by the line type exposing means 16 in the main scanning direction, the exposure start signal F may be outputted at a particular time for changing the position of the image in the main scanning direction. This is successful in bringing the images to be formed by the exposing means 13 and 16 into accurate register and, therefore, in insuring a printing free from the deviation of colors.

FIG. 6 shows a circuit 71 for changing the image forming width and which is a specific form of the image position changing means of the type changing the image forming width in the main scanning direction. As shown, the circuit 71 is implemented as a PLL (Phase Locked Loop) circuit and made up of an oscillator 72, a phase comparator 73, a low pass filter 73a, an amplifier 74, a VCO (Voltage Controlled Oscillator) 75, and a programmable frequency divider 76 connected between the output of the VCO 75 and the phase comparator 73. Assume that the oscillator 72 has an oscillation frequency of $f_o$, and that the programmable frequency divider 76 has a division ratio of 1/N. Then, the frequency available with a clock CLK is $Nf_o$. Therefore, if the division ratio of the frequency divider 76 is $1/(N+1)$, i.e., data to be applied to the frequency divider 76 is $N+1$, then the frequency of the clock to be produced changes by $(N+1)f_o - Nf_o$. In this manner, by changing the data to be applied to the frequency divider 76, it is possible to change the frequency of the video clock E and, therefore, the image forming width (magnification) in the main scanning direction by each step of $f_o$. Specifically, when the period S of the video clock E is increased, i.e., when the frequency of the video clock E is reduced, the image forming width in the main scanning direction will be increased, and vice versa. This prevents the images to be formed by the exposing means 13 and 16 from deviating from each other.

Figure 9:
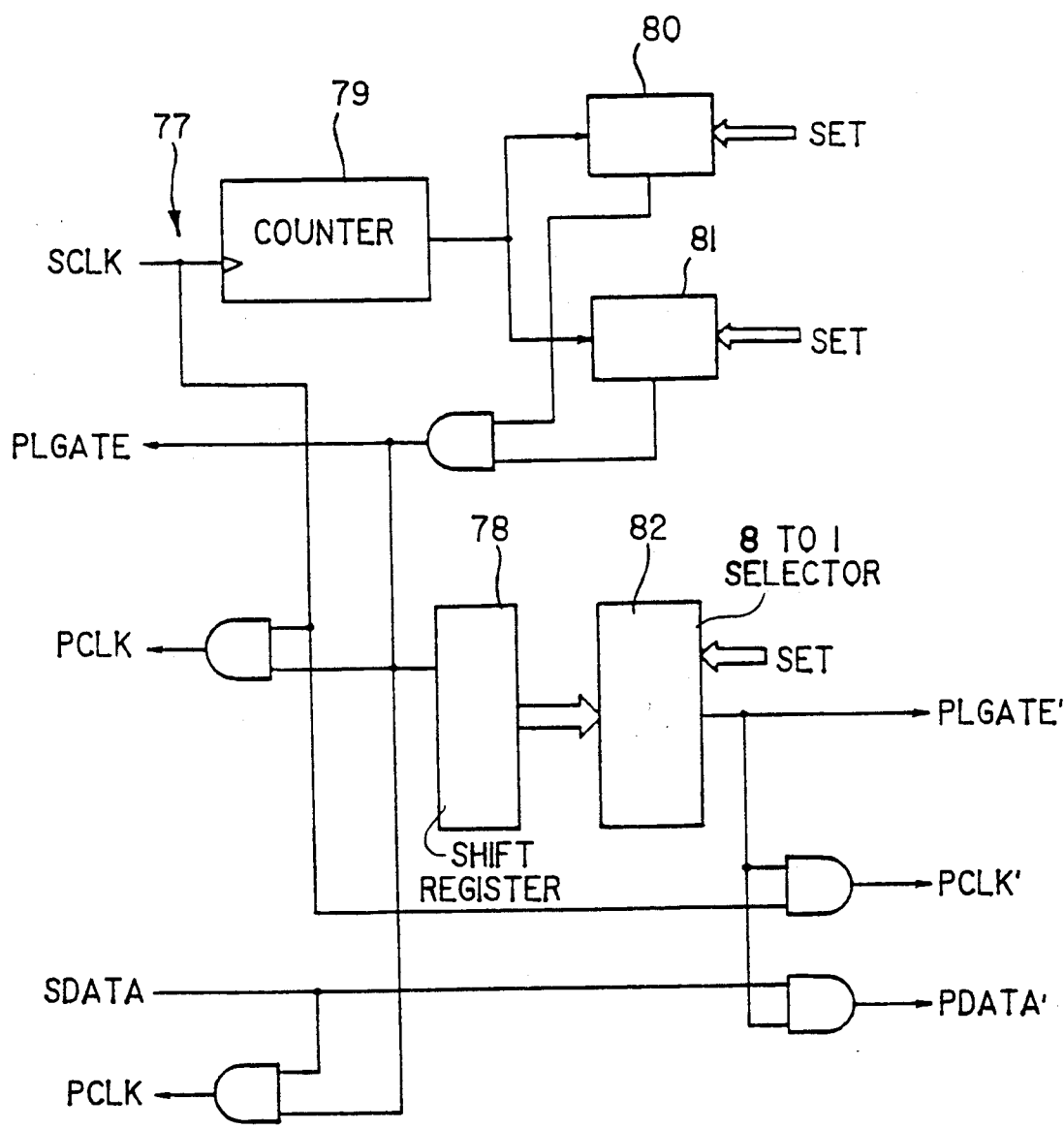
FIG. 9 is a circuit diagram showing a circuit for setting a time for starting exposure and playing the role of image position changing means.
Figure 10:
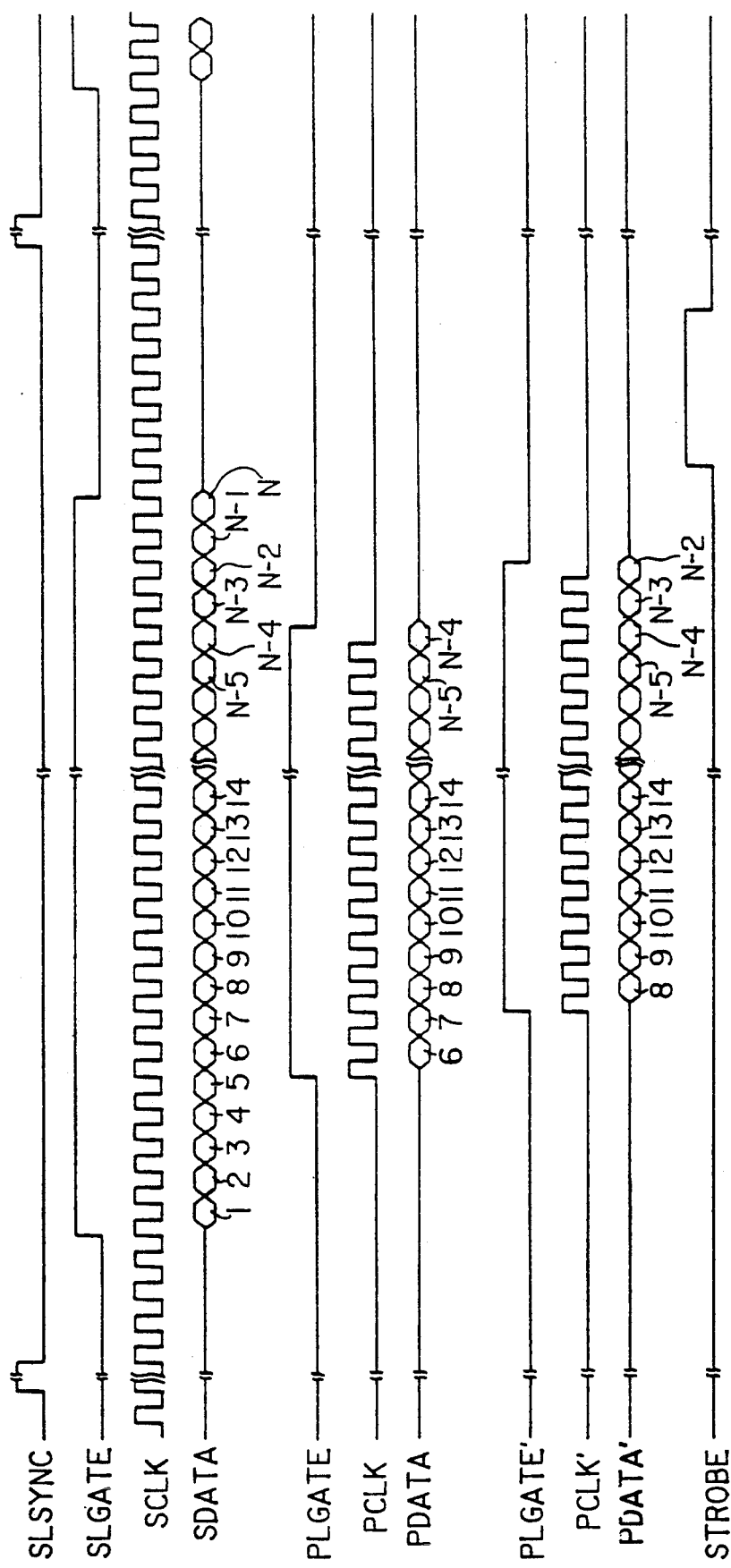
FIG. 10 is a timing chart associated with FIG. 9.

FIGS. 9 and 10 show a circuit 77 for setting an exposure start time and which is a specific form of the image position changing means of the type changing the image forming width in the main scanning direction. How the embodiment operates when the exposure start time of the line type exposing means 16 is deviated relative to that of the deflection scanning type exposing means 13 will be described. The exposing means 16 is controlled by a shift register 78 capable of storing one line of data, and a signal STROBE for energizing the LED array chip 34. The document reading device 3 sends to the circuit 77 a line synchronization signal SLSYNC, an image valid signal SLGATE, a read pixel clock SCLK, and video data SDATA representative of a document image. For printer control, the circuit 77 generates a signal PLGATE matching a paper sheet, and a video clock PLCK which turns on only when the image is valid. With these signals PLGATE and PCLK, the circuit 77 validates only the necessary part of the data sent from the document reading device 3 and transfers the valid data to the shift register 78. After one line of data has been written to the shift register 78, the signal STROBE is brought to a high level. Then, the LED array chip 34 turns on to write the image on the photoconductive element 11.

As shown in FIG. 9, the image valid signal PLGATE is generated by a counter 79 to which the read pixel clock SCLK from the document reading device 3 is applied, and comparators 80 and 81, according to the timing shown in FIG. 10.

Assume that the exposure start time of the deflection scanning type exposing means 13 is deviated by a period of time corresponding to two dots. Then, if an 8 to 1 selector 82 shown in FIG. 9 has the set value thereof deviated by two dots, each of the control signals can be shifted by two dots. This produces an image valid signal PLGATE', a video clock PCLK', and video data PDATA'. Alternatively, the set values of the comparators 80 and 81 may be changed at the same time so as to bring the exposure start time of the exposing means 16 into coincidence with that of the exposing means 13.

FIGS. 11, FIG. 12A and 12B show another alternative embodiment of the present invention. As shown, the housing 32 of the line type exposing means 16 is mounted on a support member 83 in such a manner as to be movable in the direction of rotation of the drum 11. The support member 83 is affixed to a frame or similar stationary member, not shown. Image position adjusting means 83 is provided for changing the position of the exposing means 16 in the direction of rotation of the drum 11. The image position adjusting means 83 is made up of a leaf spring 85 biasing the bottom of the exposing means 16, and an adjusting screw 86 threaded into the support member 83 and urging the top of the exposing means 16. Such image position adjusting means 84 is located at both sides of the support member 83.

In the above construction, the deviation of images formed by the two exposing means 13 and 16 from each other should not exceed one dot (several tens of microns). The illustrative embodiment can bring an image formed by the exposing means 16 into register with an image formed by the exposing means 13 in the subscanning direction only if the adjusting screw 86 is turned. This is successful in insuring a printing free from color deviation in the subscanning direction. Further, as shown in FIG. 12A, assume that the scanning line formed by the exposing means 16 is inclined relative to the scanning line formed by the exposing means 13. Then, the two scanning lines will become parallel to each other, as shown in FIG. 12B, only if the right and left adjusting screws 86 are operated to displace the associated ends of the exposing means 16.

Figure 14:
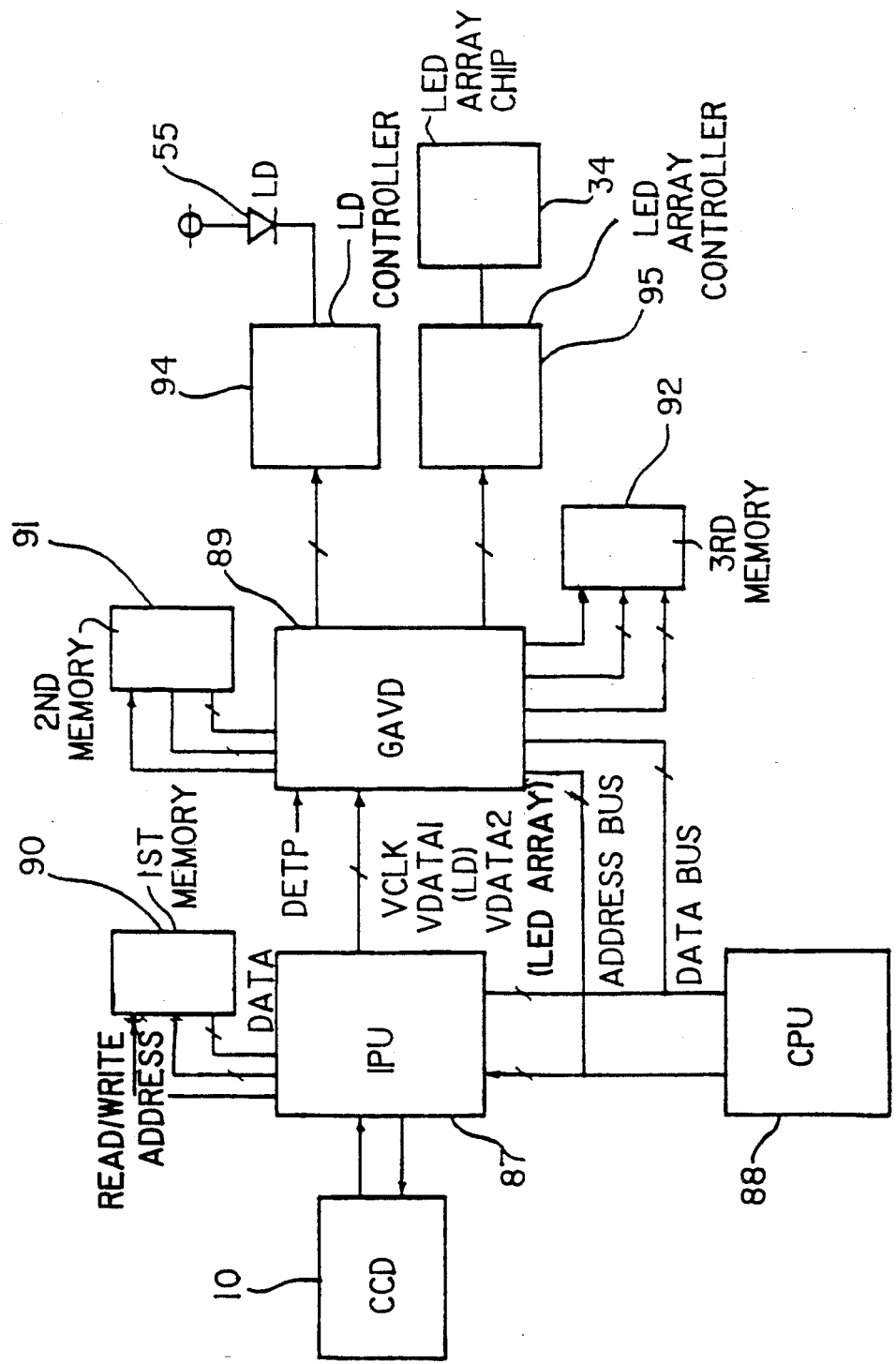
FIG. 14 is a block diagram schematically showing electronic circuitry.

Referring to FIGS. 13–17, another alternative embodiment of the present invention will be described. As shown in FIG. 13, the deflection scanning type exposing means 13 has the sensor 64 for generating the synchronization signal. As shown in FIG. 14, an IPU (Image Processing Unit) 87 is connected to the image sensor 10 of the document reading device 3. The IPU 87, a CPU 88, a GAVD (video modulating section) 89, a first memory 90, a second memory 91 and a third memory 92 are connected by an address bus and a data bus. Connected to the GAVD 89 are an LD controller 94 for controlling the laser diode 55 of the exposing means 13, and an LED array controller 95 for controlling the LED array chip 34 of the exposing means 16.

Figure 15:
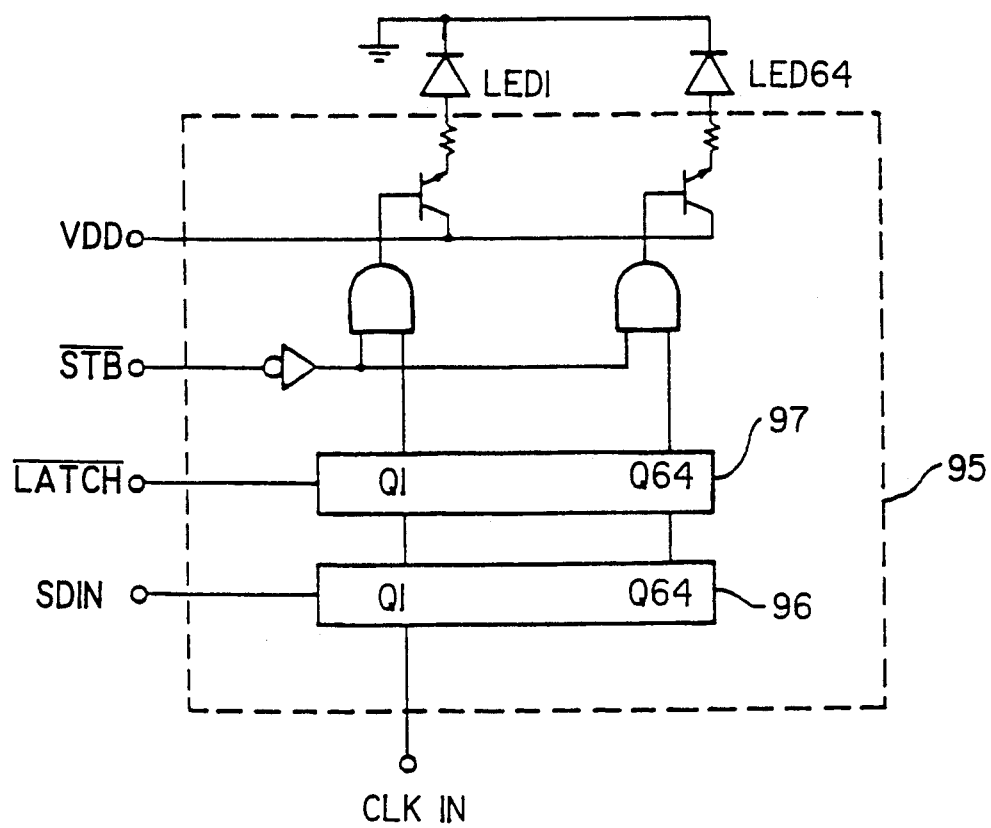
FIG. 15 is a circuit diagram showing an LED (Light Emitting Diode) array control section.

FIG. 15 shows a specific construction of the LED array controller 95. As shown, video data are serially applied to an input SDIN. A video clock is fed to an input CLKIN. The serial video data are transformed to parallel data by a shift register 96 in synchronism with the video clock. In response to an inverted latch signal LATCH, a latch 97 latches the parallel video data. When an inverted strobe signal STB turns from a high level to a low level, the latched parallel data are fed to LEDs1-LED64 (see a timing chart shown in FIG. 17).

Figure 16:
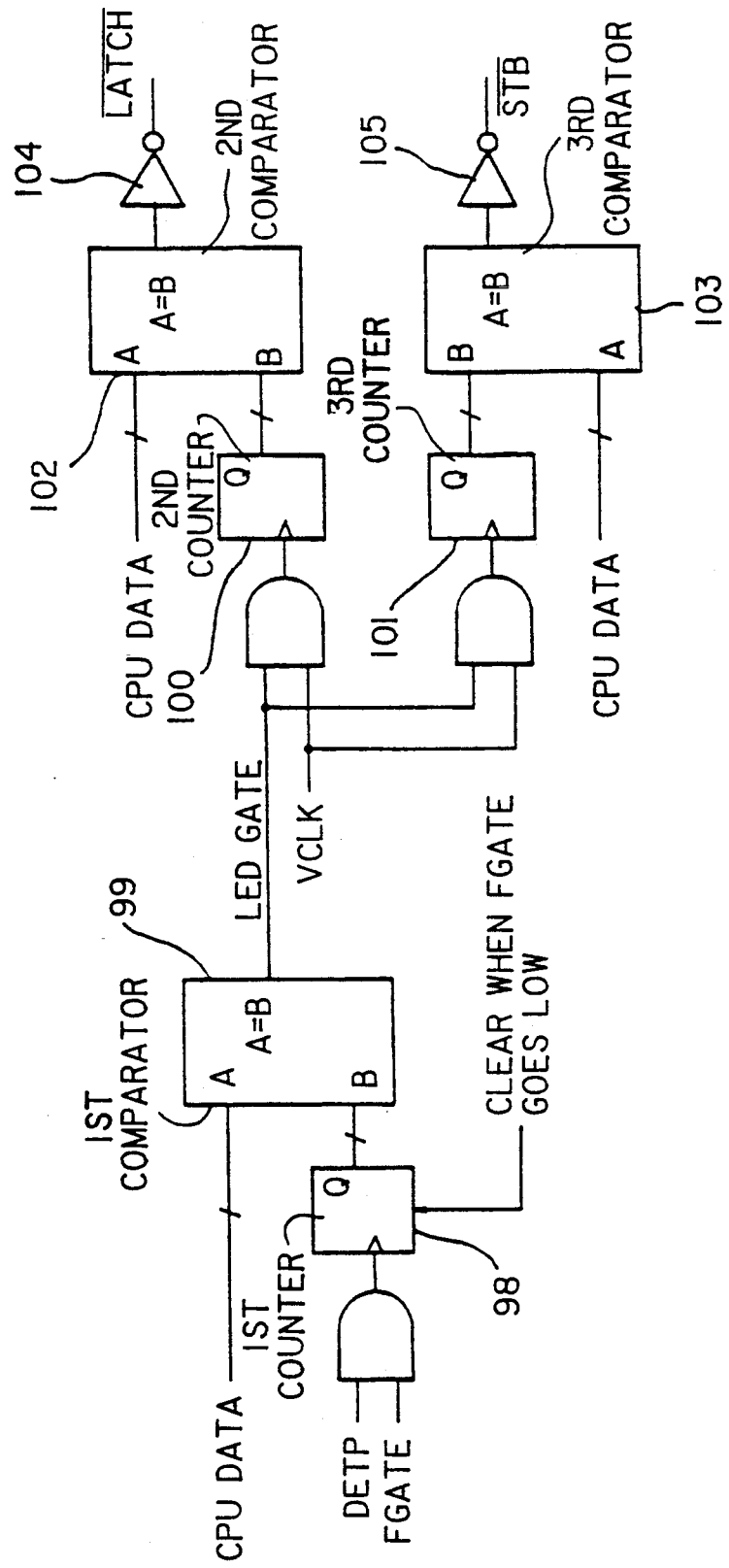
FIG. 16 is a circuit diagram showing an LED array control circuit.
Figure 17:
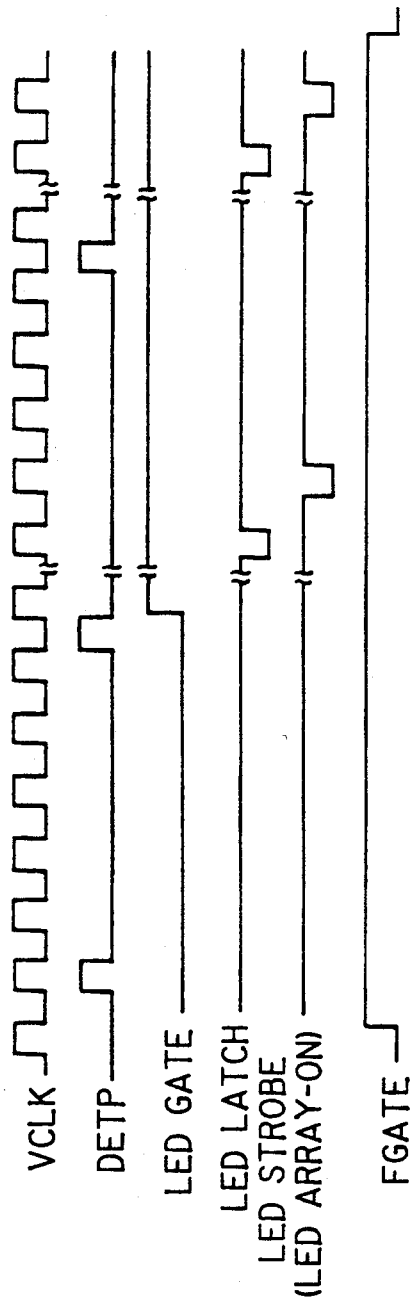
FIG. 17 is a timing chart associated with FIG. 16.

An LED array control circuit included in the GAVD 89 will be described with reference to FIG. 16. As shown, a first counter 98, a first comparator 99, a second and a third counter 100 and 101, a second and a third comparator 102 and 103, and inverters 104 and 105 for inverting the outputs of the comparators 102 and 103, respectively, are connected. When a signal FGATE (subscanning valid period signal) goes high, a synchronization signal DETP from the sensor 64 is applied to the first counter 98. As the count of the counter 98 reaches a predetermined value, the output of the first comparator 99, i.e., the LED gate signal goes high with the result that a clock VCLK is applied to the second counter 100. When the count of the counter 100 reaches a predetermined value set in the CPU 88, the output of the second comparator 102 is inverted by the inverter 104 and then fed to the LED array controller 95 as the inverted signal LATCH. On the change of the LED gate signal to a high level, the clock VCLK is applied to the third counter 101. As the count of the 101 becomes equal to the predetermined value of the CPU 88, the output of the comparator 103 is inverted by the inverter 105 and then fed to the LED array controller 95 as the inverted strobe signal STB, i.e., the output of the LED chip 34 becomes active.

In FIG. 14, black video data and red video data meant for the exposing means 13 and 16, respectively, are stored in the first memory 90 by the IPU 87. The IPU 89 processes the black video data and red video data and converts them to serial data. The serial black data and the serial red data are fed to the GAVD 89 as data VDATA1 and VDATA2, respectively. In response, the GAVD 89 adjusts the reading speed and writing speed by use of memories 91 and 92, manipulates the black video data and delivers the resulting data to the LED controller 94, and generates the inverted latch signal LATCH and inverted strobe signal STB to feed them to the LED array controller 95. In this sense, the GAVD 89 plays the role of drive means for driving the line type exposing means 16 on the basis of the synchronization signal DEPT from the deflection scanning type exposing means 13. As a result, the operation of the exposing means 16 is synchronized to that of the exposing means 13 to enhance reliability on a line basis. In addition, the GAVD 89 functions to determine a time for driving the exposing means 16 in response to the synchronization signal DETP. Therefore, it is possible to surely determine the position of the image to be formed by the exposing means 16 in the subscanning direction relative to the image formed by the exposing means 13, eliminating color deviation on a printing in the subscanning direction.

Figure 18:
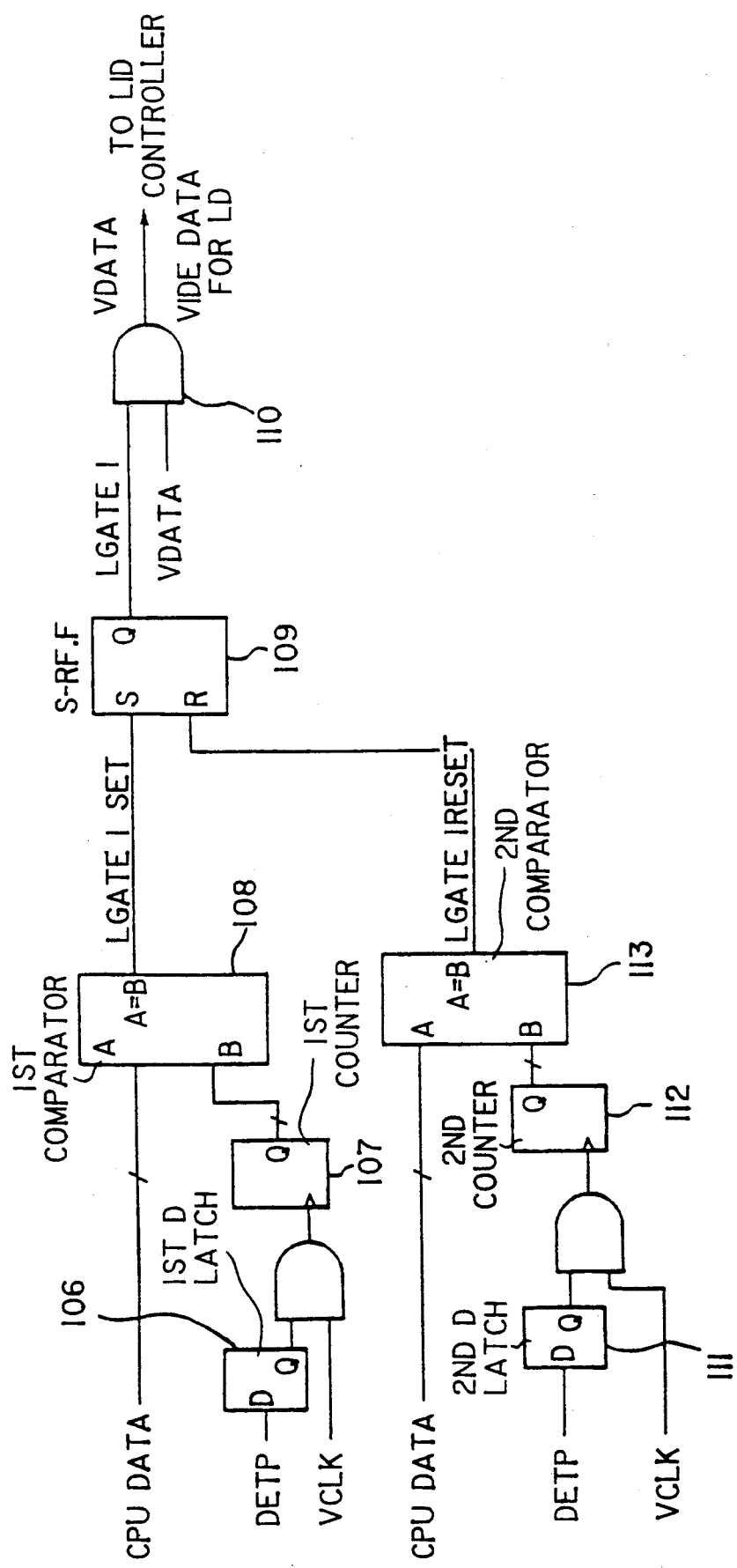
FIG. 18 is a circuit showing an LD (Laser Diode) control circuit representative of another alternative embodiment of the present invention.

Another alternative embodiment of the present invention will be described with reference to FIGS. 13, 14, 18 and 19. FIG. 18 shows a specific construction of an LD control circuit incorporated in the GAVD 89, FIG. 14. As shown, a first D latch 106, a first counter 107, a first comparator 108, an set-reset flip-flop (S-R FF) 109 and an AND gate 110 are sequentialy connected. A second D latch 111, a second counter 112 and a second comparator 113 are sequentially connected. The second comparator 113 is connected to the S-R FF 108.

Figure 19:
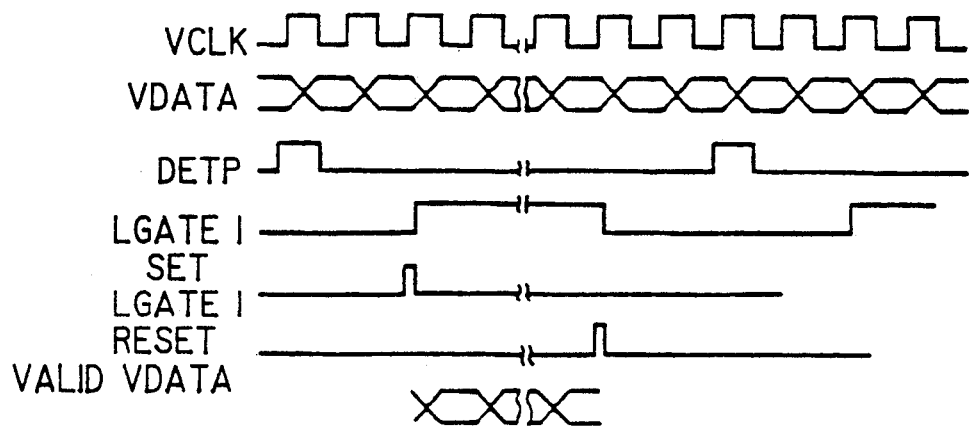
FIG. 19 is a timing chart associated with FIG. 18.

Referring to FIG. 19, when a synchronization signal DETP from the sensor 64 is applied to the first D latch 106, a clock VCLK is fed to the first counter 107. As the count of the counter 107 reaches a predetermined value set in the CPU 88, an LGATE 1 set signal which is the output of the comparator 108 goes high. As a result, an LGATE 1 set signal appearing on the output of the S-R FF 109 becomes a high level. At the same time, the signal VDATA turns from a high level to a low level. This renders the laser diode of the exposing means 13 active. When the output DETP of the sensor 64 is fed to the second D latch 111, the signal VCLK is applied to the second counter 112. As the count of the counter 112 becomes equal to the predetermined value of the CPU 88, an LGATE 1 rest signal appearing on the output of the second comparator 113 goes high. As a result, the LGATE 1 signal from the S-R FF 109 goes low to inhibit the signal VDATA from being outputted, i.e., the exposing means 13 stops exposure.

As described above, the GAVD 89 controls the time for driving the deflection scanning type exposing means 13 in response to the output DETP of the sensor 64. This allows the image writing position of the exposing means 13 in the main scanning direction to be determined with a deviation in the main scanning direction taken into account, insuring a printing without color deviation in the main scanning direction.

Figure 25:
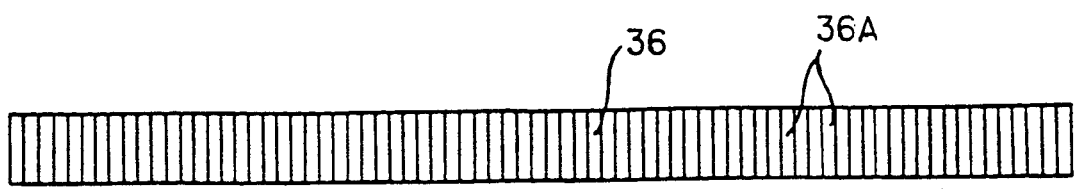
FIG. 25 is a plan view of a conventional rod lens array.
Figure 26:
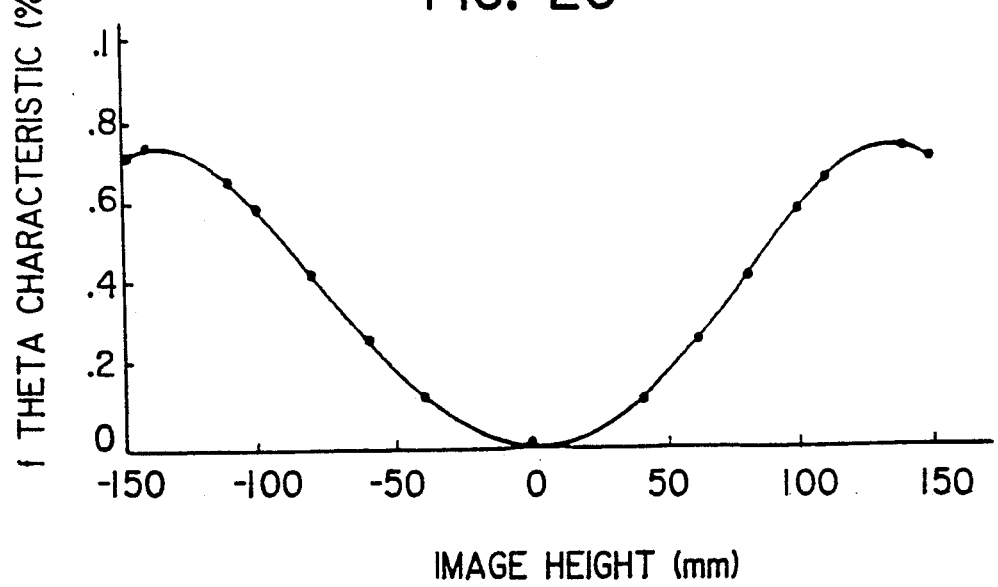
FIG. 26 is a graph indicative of the characteristic of an f-theta lens included in deflection scanning type exposing means.

Another alternative embodiment of the present invention will be described with reference to FIGS. 20 and 21. As shown in FIG. 25, the conventional line type exposing means 16 has a rod lens array 36, i.e., a parallel array of a number of lenses 36a; parallel beams are incident on the drum 11. On the other hand, as shown in FIG. 26, the f-theta lens 57 of the deflection scanning type exposing means 13 has a characteristic which sequentially increases from, for example, a position where the image height is zero, i.e., the center of an image toward the periphery of the image. It follows that although the document reading device 3 may read an image at equal intervals, the scanning pitch as measured on the drum 11 sequentially increases from the center toward opposite ends. The ratio of the scanning pitch at opposite ends to the scanning pitch at the center is referred to as a linearity. As the linearity increases, the deviation of the images formed by the exposing means 13 and 16 from each other increases, resulting in color deviation on a printing.

Figure 20:
FIG. 20 is a plan view of a rod lens array representative of another alternative embodiment of the present invention.
Figure 21:
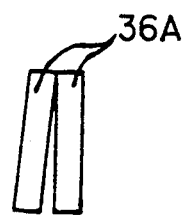
FIG. 21 is a plan view showing part of the rod lens array.

As shown in FIGS. 20 and 21, the illustrative embodiment implements the line type scanning means 16 with a rod lens array 36 having a number of lenses 36 arranged in a sector in matching relation to the characteristic of the f-theta lens 57. It should be noted that the lenses 36a are arranged at a greater pitch at the drum 11 side than at the LED array chip 34 side. With such a configuration, the embodiment successfully brings an image formed by the line type exposing means 16 into register with an image formed by the exposing means 16 despite that the latter may be compressed or expanded in the main scanning direction due to the f-theta characteristic. Since the lenses 36a are arranged at a greater pitch at the drum 11 side than at the LED array chip 34 side, as mentioned above, the light from the exposing means 16 can reach the drum 11 with a certain spread matching the f-theta characteristic of the exposing means 13, freeing a printing from color deviation. Alternatively, the density in which the lenses 36a are arranged may be sequentially reduced from the center to opposite ends of the rod lens array 36. This is also successful in providing the light from the exposing means 16 with the above-mentioned spread.

In summary, the present invention provides an image forming apparatus having various unprecedented advantages, as enumerated below.

(1) Parts around a photoconductive element are arranged with ease to promote the miniaturization of the apparatus. This stems from the principle that the image quality may be enhanced for an image of particular color and be lowered for an image of another color expected to be printed less frequently. Specifically, the apparatus has deflection scanning type exposing means for forming the image of particular color, and line type exposing means which has an inherently long optical path and simple structure for forming the image of another color.

(2) Based on the above principle, the line type exposing means has the number of tones thereof per dot reduced to thereby reduce the required capacity of a memory for storing video data and, therefore, the cost of the apparatus.

(3) Based on the above principle, the pixel density of the line type exposing means is reduced. This is also successful in reducing the required capacity of a memory and, therefore, the cost.

(4) The simple line type exposing means promotes easy arrangement of parts around the photoconductive element and, therefore, the miniaturization of the apparatus. Image position changing means brings images formed by the two different types of exposing means into register with each other in the main scanning direction, insuring a printing without color deviation in the main scanning direction.

(5) An angle adjusting mechanism is provided for inclining the line type exposing means relative to the axis of the photoconductive element, so that the image forming width of the exposing means may be changed in the main scanning direction. Therefore, images formed by the two different types of exposing means coincide with each other in the main scanning direction, whereby a printing without color deviation is insured. Since the angle adjusting mechanism has a simple structure and is a mechanical implementation, it realizes simple image position changing means.

(6) The angle adjusting mechanism displaces, among the constituents of the line type exposing means, a base plate supporting light emitting elements or an optical shutter angularly relative to the axis of the photoconductive element. With such a mechanism, it is possible to adjust the image forming width of the line type exposing means in the main scanning direction.

(7) Path length adjusting means is provided for adjusting the length of an optical path extending from a deflector to the photoconductive element, i.e., the image position of the deflection scanning type exposing means in the main scanning direction. This also insures a printing without color deviation in the main scanning direction. Since the path length adjusting means is implemented as a simple mechanical implementation, it constitutes simple image position changing means.

(8) Image position adjusting means is provided for displacing the line type exposing means in the direction of rotation of the photoconductive element. With such a simple structure, it is possible to bring images formed by the two different types of exposing means into register and, therefore, to insure a printing free from color deviation in the subscanning direction.

(9) Image position adjusting means is provided for displacing the opposite ends of the line type exposing means in the direction of rotation of the photoconductive element. With such means, not only the advantage (8) stated above is achieved, but also a scanning line formed by the line type exposing means is surely held parallel to a scanning line formed by the deflection scanning type exposing means.

(10) The line type exposing means is driven on the basis of a synchronization signal generated by the deflection scanning type exposing means. Hence, the operation of the line type scanning means is synchronized to that of the deflection scanning type exposing means, whereby reliability is enhanced on a line basis.

(11) The time for driving the line type exposing means is controlled by a line type exposing means control section on the basis of the synchronization signal from the deflection type exposing means. This allows an image formed by the line type exposing means to be accurately position in the subscanning direction relative to an image formed by the deflection scanning type exposing means. Therefore, the resulting printing is free from color deviation in the subscanning direction.

(12) The time for driving the deflection scanning type exposing means is controlled by a deflection scanning type exposing means control section on the basis of the synchronization signal from the exposing means. This allows an image writing position of this type of exposing means in the main scanning direction to be determined with a deviation of the image position of the line type exposing means taken into account. Hence, the resulting printing is free from color deviation in the main scanning direction.

(13) Lenses included in the line type exposing means are arranged in a sector in matching relation to the characteristic of an f-theta lens included in the deflection scanning type exposing means. Hence, although an image may be compressed or expanded in the main scanning direction due to the f-theta characteristic of the deflection scanning type exposing means, an image formed by the line type exposing means is surely brought into register with such an image.

(14) The lenses are arranged at a greater pitch at the photoconductive element side than at the light emitting element side. Hence, light from the light emitting elements of the line type exposing means can be incident to the photoconductive element with a spread matching the f-theta characteristic of the deflection scanning type exposing means. This is also successful in achieving the above advantage (13).

(15) The lenses are arranged in a density which sequentially decreases from the center toward opposite ends. Then, the light from the light emitting elements can also be provided with a spread matching the f-theta characteristic, achieving the above advantage (13).

Various modifications will become possible for those skilled in the art after receiving the teachings of the present disclosure without departing from the scope thereof.

What is claimed is:

1. An image forming apparatus comprising:
a rotatable photoconductive element;
charging means located to face periphery of said photoconductive element;
deflection scanning type exposing means for deflecting a light beam issuing from a beam emitting element toward said photoconductive element;
first developing means for developing an electrostatic latent image formed on the periphery of said photoconductive element by said deflection scanning type exposing means;
line type exposing means located to face part of the periphery of said photoconductive element other than part where the light beam from said deflection scanning type exposing means is incident; and
second developing means for developing an electrostatic latent image formed on the periphery of said photoconductive element by said line type exposing means;
wherein the number of tones per dot of an image is smaller in said line type exposing means than in said deflection scanning type exposing means.

2. An image forming apparatus comprising:
a rotatable photoconductive element;
charging means located to face periphery of said photoconductive element;
deflection scanning type exposing means for deflecting a light beam issuing from a beam emitting element toward said photoconductive element;
first developing means for developing an electrostatic latent image formed on the periphery of said photoconductive element by said deflection scanning type exposing means;
line type exposing means located to face part of the periphery of said photoconductive element other than part where the light beam from said deflection scanning type exposing means is incident; and
second developing means for developing an electrostatic latent image formed on the periphery of said photoconductive element by said line type exposing means;
wherein a pixel density is smaller in said line type exposing means than in said deflection scanning type exposing means.

3. An apparatus as claimed in claim 2, wherein the electrostatic latent images formed on said photoconductive element by said deflection scanning type exposing means and said line type exposing means are each developed in a particular color by an associated one of said first developing means and said second developing means, said apparatus further comprising drive means for driving said line type exposing means on the basis of a synchronization signal generated by said deflection scanning type exposing means.

4. An apparatus as claimed in claim 3, further comprising a line type exposing means control section for determining a time for driving said line type exposing means on the basis of said synchronization signal.

5. An apparatus as claimed in claim 3, further comprising a deflection scanning type exposing means control section for determining a time for driving said deflection scanning type exposing means on the basis of said synchronization signal.

6. An image forming apparatus comprising:
a rotatable photoconductive element;
charging means located to face periphery of said photoconductive element;
deflection scanning type exposing means for deflecting a light beam issuing from a beam emitting element toward said photoconductive element;
first developing means for developing an electrostatic latent image formed on the periphery of said photoconductive element by said deflection scanning type exposing means;
line type exposing means located to face part of the periphery of said photoconductive element other than part where the light beam from said deflection scanning type exposing means is incident; and
second developing means for developing an electrostatic latent image formed on the periphery of said photoconductive element by said line type exposing means;
wherein the electrostatic latent images formed on said photoconductive element by said deflection scanning type exposing means and said line type exposing means are each developed in a particular color by an associated one of said first developing means and said second developing means, said apparatus further comprising image position changing means for changing an image position of at least one of said deflection scanning type exposing means and said line type exposing means in a main scanning direction.

7. An apparatus as claimed in claim 6, wherein said image position changing means comprises an angle adjusting mechanism for displacing said line type exposing means in a direction for inclining said line type exposing means relative to an axis of said photoconductive element.

8. An apparatus as claimed in claim 6, wherein said line type exposing means comprises one of self-emitting exposing means wherein a number of light emitting elements are arranged in an array on a base plate, and optical shutter type exposing means wherein a light source and an optical shutter are provided, said image position changing means comprising an angle adjusting mechanism for displacing said base plate or said optical shutter in a direction for inclining said substrate or said optical shutter relatie to an axis of said photoconductie element.

9. An apparatus as claimed in claim 6, wherein said image position changing means comprises a path length adjusting mechanism for changing a length of an optical path extending from a deflector included in said deflection scanning type exposing means to the periphery of said photoconductive element.

10. An image forming apparatus comprising:
a rotatable photoconductive element;
charging means located to face periphery of said photoconductive element;
deflection scanning type exposing means for deflecting a light beam issuing from a beam emitting element toward said photoconductive element;
first developing means for developing an electrostatic latent image formed on the periphery of said photoconductive element by said deflection scanning type exposing means;
line type exposing means located to face part of the periphery of said photoconductive element other than part where the light beam from said deflection scanning type exposing means is incident; and
second developing means for developing an electrostatic latent image formed on the periphery of said photoconductive element by said line type exposing means;
wherein the electrostatic latent images formed on said photoconductive element by said deflection scanning type exposing means and said line type exposing means are each developed in a particular color by an associated one of said first developing means and said second developing means, said apparatus further comprising image position adjusting means for displacing said line type exposing means in a direction of rotation of said photoconductive element.

11. An apparatus as claimed in claim 10, wherein said image position adjusting means displaces opposite ends of said line type exposing means in the direction of rotation of said photoconductive element.

12. An image forming apparatus comprising:
a rotatable photoconductive element;
charging means located to face periphery of said photoconductive element;
deflection scanning type exposing means for deflecting a light beam issuing from a beam emitting element toward said photoconductive element;
first developing means for developing an electrostatic latent image formed on the periphery of said photoconductive element by said deflection scanning type exposing means;
line type exposing means located to face part of the periphery of said photoconductive element other than part where the light beam from said deflection scanning type exposing means is incident; and
second developing means for developing an electrostatic latent image formed on the periphery of said photoconductive element by said line type exposing means;
wherein the electrostatic latent images formed on said photoconductive element by said deflection scanning type exposing means and said line type exposing means are each developed in a particular color by an associated one of said first developing means and said second developing means, said apparatus further comprising a rod lens array included in said line type exposing means and comprising a number of lenses arranged in a sector in matching relation to an f-theta characteristic of an f-theta lens included in said direction scanning type exposing means.

13. An apparatus as claimed in claim 12, wherein said number of lenses are arranged at a greater pitch at a photoconductive element side than at a light emitting element side.

14. An apparatus as claimed in claim 12, wherein said number of lenses are arranged in a density which sequentially decreases from a center to opposite ends.

* * * * *